US012782778B2

(12) United States Patent
Chao et al.

(10) Patent No.: US 12,782,778 B2
(45) Date of Patent: Nov. 3, 2026

(54) DISPLAY DEVICE

(71) Applicant: HANNSTAR DISPLAY CORPORATION, Taipei City (TW)

(72) Inventors: Guang-Shiung Chao, Tainan City (TW); Wei-Min Li, Taichung City (TW); Hsuan-Chen Liu, Kaohsiung City (TW); Yen-Chung Chen, Taichung City (TW)

(73) Assignee: HANNSTAR DISPLAY CORPORATION, Taipei City (TW)

( * ) Notice: Subject to any disclaimer, the term of this patent is extended or adjusted under 35 U.S.C. 154(b) by 0 days.

(21) Appl. No.: 18/909,883

(22) Filed: Oct. 8, 2024

(65) Prior Publication Data

US 2025/0298273 A1 Sep. 25, 2025

(30) Foreign Application Priority Data

Mar. 25, 2024 (TW) ................................ 113110940

(51) Int. Cl.
*G02F 1/1339* (2006.01)
*G02F 1/13* (2006.01)

(52) U.S. Cl.
CPC ........ *G02F 1/13394* (2013.01); *G02F 1/1323* (2013.01); *G02F 1/13396* (2021.01)

(58) Field of Classification Search
CPC . G02F 1/13394; G02F 1/13396; G02F 1/1323
See application file for complete search history.

(56) References Cited

U.S. PATENT DOCUMENTS

2016/0349575 A1* 12/2016 Li ..................... G02F 1/133784
2018/0173034 A1* 6/2018 Yonemura ......... G02F 1/133305
2021/0333579 A1 10/2021 Lin
2023/0251522 A1* 8/2023 Murata ............... G02F 1/13706
349/56

FOREIGN PATENT DOCUMENTS

CN 111443531 7/2020
CN 111443531 A * 7/2020 ......... G02F 1/13394
CN 113267924 8/2021
CN 113311601 8/2021
TW 202141136 11/2021
WO WO-2019198375 A1 * 10/2019 ............... G09F 9/30

OTHER PUBLICATIONS

PE2E English translation of CN111443531A (Year: 2020).*
PE2E English translation of WO2019198375A1 (Year: 2019).*

* cited by examiner

*Primary Examiner* — David Y Chung
(74) *Attorney, Agent, or Firm* — Winston Hsu

(57) ABSTRACT

A display device includes a display panel and an anti-peeping panel. The anti-peeping panel includes a first substrate, a second substrate, a liquid crystal layer, a plurality of first spacers and a plurality of second spacers. The liquid crystal layer, the first spacers and the second spacers are disposed between the first substrate and the second substrate. The first spacers are arranged in a plurality of columns. A first density is the ratio of the sum of areas of bottom surfaces of the first spacers to a unit area of a closed unit. The second spacers are randomly distributed. A second density is the ratio of the sum of areas of bottom surfaces of the second spacers to the unit area of the closed unit. The ratio of the first density to the second density ranges from 1:2 to 1:8.

8 Claims, 9 Drawing Sheets

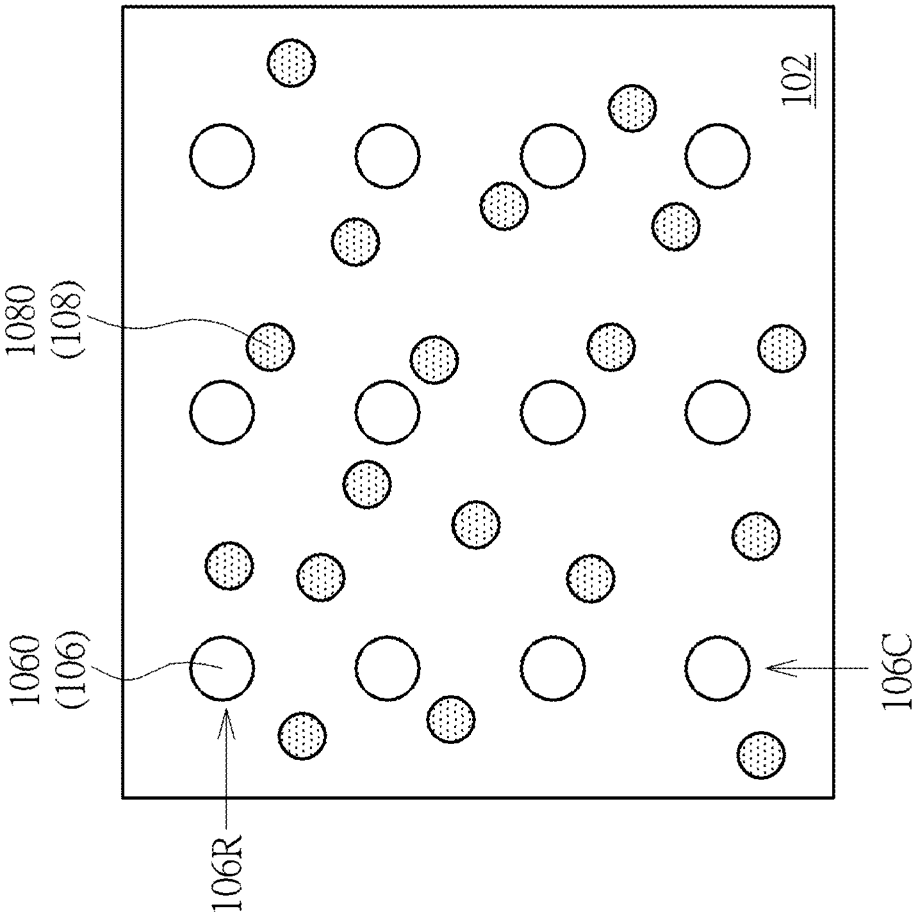
FIG. 3
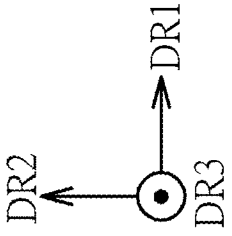

DISPLAY DEVICE

BACKGROUND OF THE INVENTION

1. Field of the Invention

The present invention relates to a display device, and more particularly, to a display device with an anti-peeping function.

2. Description of the Prior Art

Display devices have the advantages of thinness and low power consumption, and display devices have been widely used in various electronic products, such as Desktop PCs, Notebook PCs, Tablet PCs, smartphones, etc. With the increasing demand of users for information security and privacy, more and more display devices include the anti-peeping function. However, one of the problems needed to be solved in this field is making anti-peeping display devices have better anti-peeping effects and better display quality.

SUMMARY OF THE INVENTION

This invention aims to provide a display device for solving the technical problems of improving both the anti-peeping effects and the display quality.

In order to solve the above technical problems, the present invention provides a display device including a display panel and an anti-peeping panel, and the anti-peeping panel is disposed at one side of the display panel. The anti-peeping panel includes a first substrate, a second substrate, a liquid crystal layer, a plurality of first spacers, and a plurality of second spacers. The second substrate is disposed on the first substrate. The liquid crystal layer is disposed between the first substrate and the second substrate. The first spacers are disposed between the first substrate and the second substrate. The first spacers are arranged in a plurality of columns. Four adjacent first spacers in the plurality of first spacers and four virtual lines define a closed unit. Two ends of each of the virtual lines are connected with two adjacent first spacers of the four adjacent first spacers, and the closed unit has a unit area. A first density is a ratio of a sum of areas of bottom surfaces of the four adjacent first spacers in the closed unit to the unit area of the closed unit. The second spacers are disposed between the first substrate and the second substrate, and the second spacers are randomly distributed between the first substrate and the second substrate. A second density is a ratio of a sum of areas of bottom surfaces of the second spacers in the closed unit to the unit area of the closed unit, and a ratio of the first density to the second density ranges from 1:2 to 1:8.

In the anti-peeping panel of the display device in the present invention, the first spacers are periodically arranged, the second spacers are randomly and uniformly distributed, and the ratio of the first density of the first spacers to the second density of the second spacers ranges from 1:2 to 1:8. The moire phenomenon can be alleviated when the first density of the first spacer is low. The light leakage occurred at the location of the first spacers can be reduced when the first density of the first spacers is low, improving the anti-peeping effect. Since the randomly distributed second spacers are less likely to generate moire patterns, the second density of the second spacers can be increased to further support and protect the anti-peeping panel. The ratio of the first density to the second density in different regions of the anti-peeping panel conforms to the above-mentioned range, which can ensure that the second spacers can be randomly and uniformly distributed between the substrates, and the surface pressure resistance and/or anti-peeping effect in different regions of the anti-peeping panel can be uniform.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram illustrating the distribution of spacers in the anti-peeping panel according to the first embodiment of the present invention.

DETAILED DESCRIPTION

Figure 1:
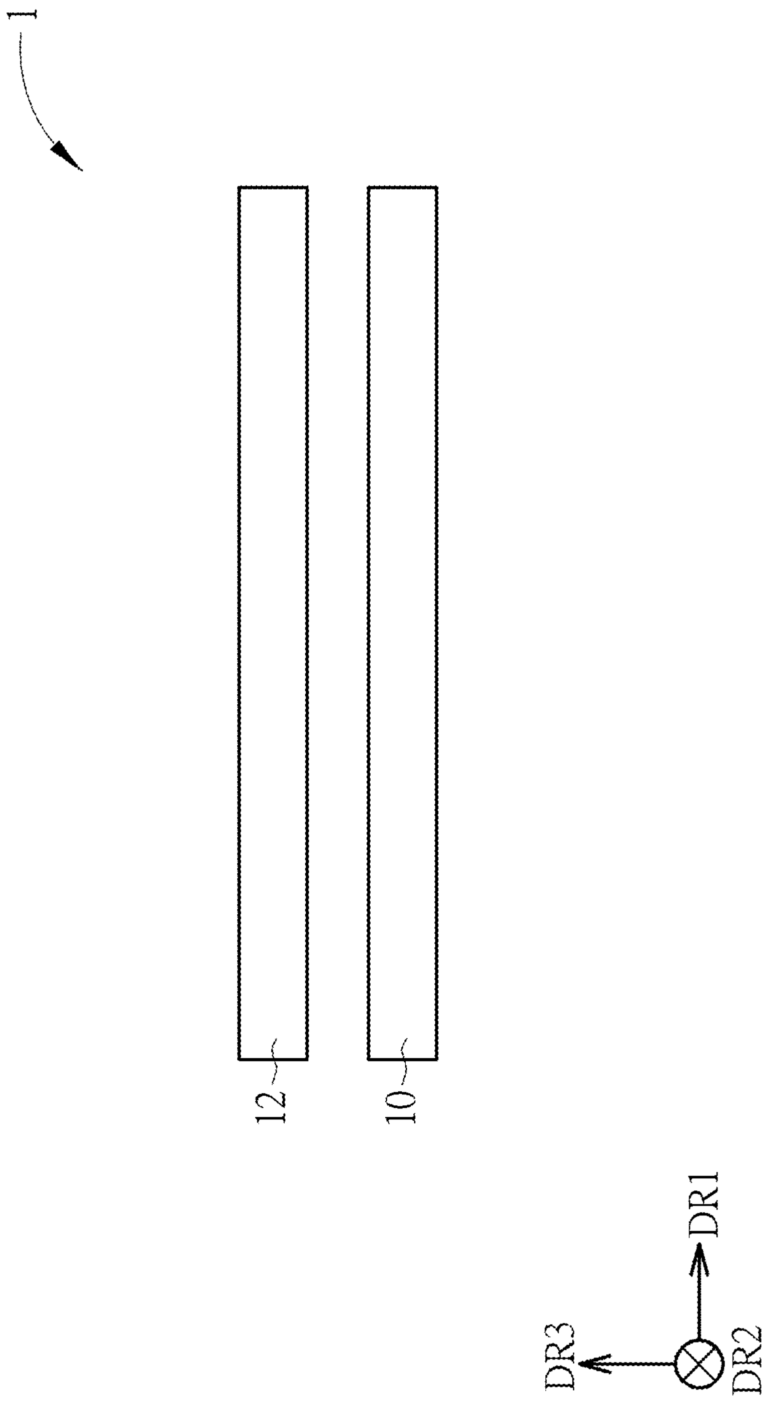
FIG. 1 is a schematic diagram illustrating a cross-sectional view of a display device according to a first embodiment of the present invention.

To provide a better understanding of the present invention to those skilled in this field, preferred embodiments will be detailed as follows. The preferred embodiments of the present invention are illustrated in the accompanying drawings to elaborate on the contents and effects to be achieved. It should be noted that the drawings are simplified schematics, and therefore show only the components and combinations associated with the present invention, to provide a clearer description of the basic architecture or method of implementation. The components would be complex in reality. In addition, for ease of explanation, the components shown in the drawings may not represent their actual number, shape, and dimensions; details can be adjusted according to design requirements.

A direction DR1, a direction DR2, and a direction DR3 are shown in the following drawings. The direction DR3 may be the normal direction or the top view direction. The direction DR1 and the direction DR2 may be horizontal directions and perpendicular to the direction DR3. The direction DR1 and the direction DR2 are different, for example, the direction DR1 may be perpendicular to the direction DR2. The spatial relationship of the structure can be described according to the directions DR1, DR2, and DR3 in the following drawings.

Figure 2:
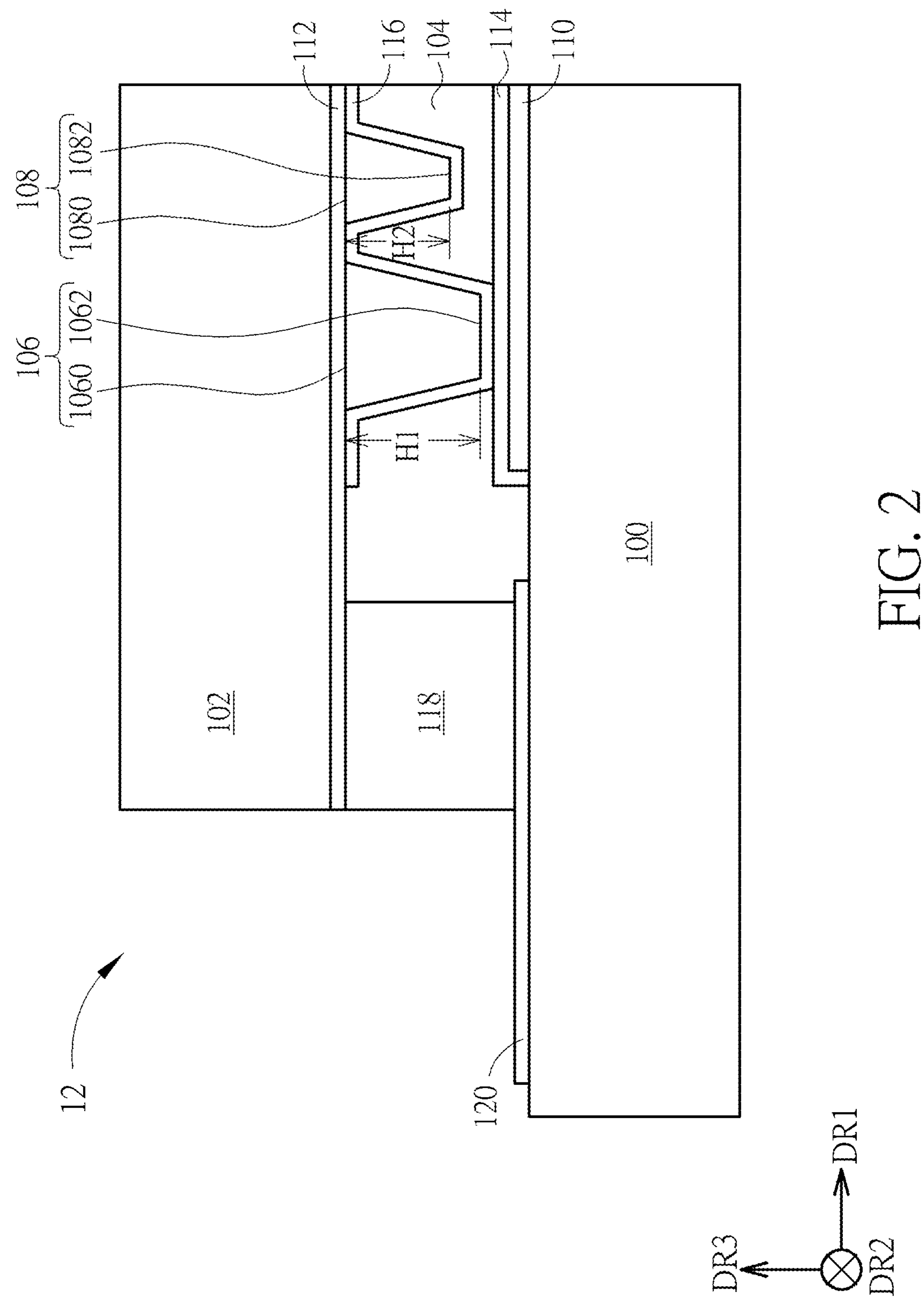
FIG. 2 is a schematic diagram illustrating a partial cross-sectional view of an anti-peeping panel according to the first embodiment of the present invention.
Figure 4:
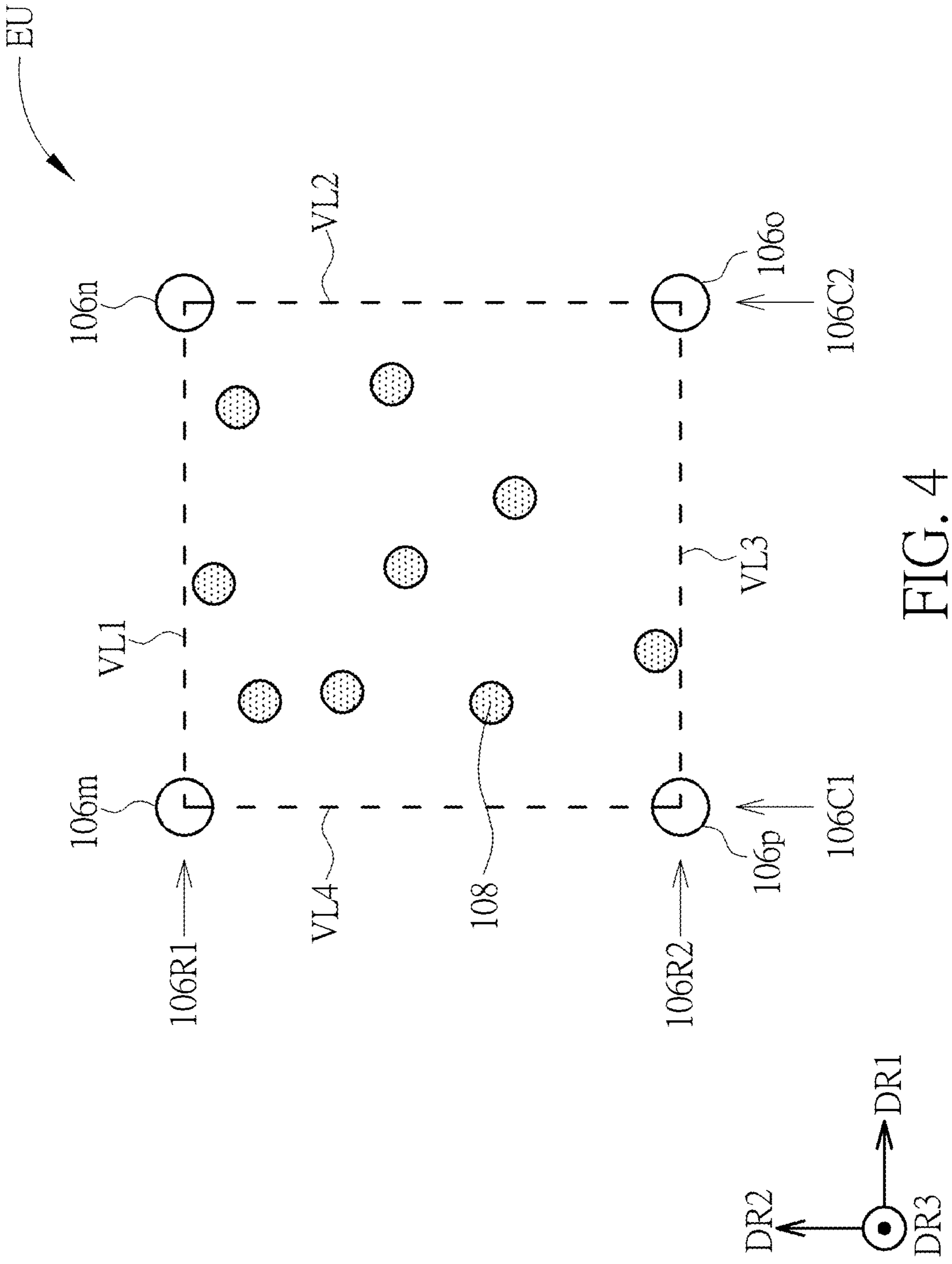
FIG. 4 is a schematic diagram illustrating a closed unit and the spacers according to the first embodiment of the present invention.

Referring to FIG. 1 to FIG. 4, FIG. 1 is a schematic diagram illustrating a cross-sectional view of a display device according to a first embodiment of the present invention, FIG. 2 is a schematic diagram illustrating a partial cross-sectional view of an anti-peeping panel according to the first embodiment of the present invention, FIG. 3 is a schematic diagram illustrating the distribution of spacers in the anti-peeping panel according to the first embodiment of the present invention, and FIG. 4 is a schematic diagram illustrating a closed unit and the spacers according to the first embodiment of the present invention. As shown in FIG. 1, a display device 1 can include a display panel 10 and an anti-peeping panel 12, but not limited thereto. For example, the direction DR3 may be perpendicular to an upper surface of the display panel 10 and/or an upper surface of the anti-peeping panel 12, and the anti-peeping panel 12 is disposed at one side, such as the upper side, of the display panel 10 in the direction DR3, but not limited thereto.

The display panel 10 may include a self-luminous display panel or a non-self-luminous display panel, but not limited thereto. The self-luminous display panel may include an organic light-emitting diode display panel or an inorganic light-emitting diode display panel, but not limited thereto. The non-self-luminous display panel may include a liquid crystal display panel, but not limited thereto. The display device 1 may further include a backlight module when the display panel 10 is the liquid crystal display panel, as described in the third to fifth embodiments.

As shown in FIG. 2, the anti-peeping panel 12 may include a substrate 100, a substrate 102, and a liquid crystal layer 104, but not limited thereto. The substrate 102 is disposed on the substrate 100, and the liquid crystal layer 104 is disposed between the substrate 100 and the substrate 102. The substrate 100 and the substrate 102 may include rigid substrates such as glass substrates, quartz substrates, or sapphire substrates, but not limited thereto. The substrate 100 and the substrate 102 may also include flexible substrates such as polyimide (PI) substrates or polyethylene terephthalate (PET) substrates, but not limited thereto.

As shown in FIG. 2 and FIG. 3, the anti-peeping panel 12 includes a plurality of spacers 106 and a plurality of spacers 108, and the spacers 106 and the spacers 108 are disposed between the substrate 100 and the substrate 102. The spacers 106 and the spacers 108 may include polymer materials, but not limited thereto. As shown in FIG. 2, the cross-sectional shape of the spacer 106 and the cross-sectional shape of the spacer 108 may be inverted trapezoids, but not limited thereto. The spacer 106 includes a bottom surface 1060 and a top surface 1062, and the spacer 108 includes a bottom surface 1080 and a top surface 1082. The bottom surface 1060 and the bottom surface 1080 are adjacent to the substrate 102, and the top surface 1062 and the top surface 1082 are away from the substrate 102. As shown in FIG. 3, the shapes of the bottom surface 1060 and the bottom surface 1080 may be circles, and the shapes of the top surface 1062 and the top surface 1082 may also be circles, but not limited thereto.

As shown in FIG. 2, the width of the bottom surface 1060 of the spacer 106 may be greater than the width of the bottom surface 1080 of the spacer 108, but not limited thereto. As shown in FIG. 3, the area of the bottom surface 1060 of the spacer 106 may be greater than the area of the bottom surface 1080 of the spacer 108, but not limited thereto. As shown in FIG. 2, the spacer 106 has a height H1, the spacer 108 has a height H2, and the height H1 is greater than the height H2, but not limited thereto.

When the height H1 of the spacer 106 is greater than the height H2 of the spacer 108, the spacers 106 are mainly used to support the substrate 100 and the substrate 102 and form a space to accommodate the liquid crystal layer 104. When the anti-peeping panel 12 is pressed by an external force and the spacers 106 are insufficient to resist the external force, the spacers 108 can be used to further support the anti-peeping panel 12 to protect the anti-peeping panel 12. In some embodiments, the height H1 and the height H2 may be the same and/or the area of the bottom surface 1060 and the area of the bottom surface 1080 may be the same, but not limited thereto.

As shown in FIG. 2, the anti-peeping panel 12 further includes a transparent conductive layer 110, a transparent conductive layer 112, an alignment film 114, and an alignment film 116. The transparent conductive layer 110 and the alignment film 114 are disposed at the upper surface of the substrate 100, and the transparent conductive layer 112 and the alignment film 116 are disposed at the lower surface of the substrate 102. The transparent conductive layer 110 is disposed between the substrate 100 and the liquid crystal layer 104, and the alignment film 114 is disposed between the transparent conductive layer 110 and the liquid crystal layer 104. The transparent conductive layer 112 is disposed between the spacers 106 and the substrate 102 and between the spacers 108 and the substrate 102. The alignment film 116 covers the spacers 106 and 108, and the alignment film 116 also covers a portion of the transparent conductive layer 112. The alignment films 114 and 116 may include polyimide, but not limited thereto.

The anti-peeping panel 12 further includes a sealant 118 and a transparent conductive layer 120. The sealant 118 and the transparent conductive layer 120 may be disposed at the peripheral region of the anti-peeping panel 12. The transparent conductive layer 120 is disposed at the upper surface of the substrate 100 and separated from the transparent conductive layer 110, and the sealant 118 is disposed between the transparent conductive layer 120 and the transparent conductive layer 112. The transparent conductive layers 110, 112, and 120 may include transparent conductive materials such as indium tin oxide (ITO), but not limited thereto.

As shown in FIG. 3, in this embodiment, the spacers 106 are arranged in a plurality of columns 106C and a plurality of rows 106R. Each of the columns 106C extends along the direction DR2, and each of the rows 106R extends along the direction DR1, but not limited thereto. In addition, the spacers 108 are randomly and uniformly distributed between the substrate 100 and the substrate 102.

As shown in FIG. 4, four adjacent spacers 106*m*, 106*n*, 106*o*, and 106*p* and four virtual lines VL1, VL2, VL3, and VL4 can define a closed unit EU. In adjacent rows 106R1 and 106R2, the spacers 106*m* and 106*n* are two adjacent spacers in the row 106R1, and the spacers 106*o* and 106*p* are two adjacent spacers in the row 106R2. In adjacent columns 106C1 and 106C2, the spacers 106*m* and 106*p* are two adjacent spacers in the column 106C1, and the spacers 106*n* and 106*o* are two adjacent spacers in the column 106C2.

Two ends of each of the virtual lines are connected with two adjacent spacers 106 of the four adjacent spacers 106. As shown in FIG. 4, two ends of the virtual line VL1 are connected with the spacers 106*m* and 106*n*, two ends of the virtual line VL2 are connected with the spacers 106*n* and 106*o*, two ends of the virtual line VL3 are connected with the spacers 106*o* and 106*p*, and two ends of the virtual line VL4 are connected with the spacers 106*m* and 106*p*. The two ends of the virtual line may be, for example, connected to centers of two spacers 106. The virtual lines VL1, VL2, VL3, and VL4 are connected to each other to form the closed unit EU. In this embodiment, the closed unit EU may be rectangular, but not limited thereto. The closed unit EU has a unit area, and the spacers 108 are randomly distributed in the closed unit EU.

A first density is a ratio of a sum of areas of bottom surfaces of the four adjacent spacers 106*m*, 106*n*, 106*o*, and 106*p* in the closed unit EU to the unit area of the closed unit EU. As shown in FIG. 4, the sum of areas of bottom surfaces of the four spacers 106*m*, 106*n*, 106*o*, and 106*p* in the closed unit EU may be, for example, the sum of the area of a portion of the bottom surface of the spacer 106*m*, the area of a portion of the bottom surface of the spacer 106*n*, the area of a portion of the bottom surface of the spacer 106*o*, and the area of a portion of the bottom surface of the spacer 106*p* included in the closed unit EU. For example, the first density may be greater than or equal to 0.0758% and less than or equal to 0.0768%, but not limited thereto.

As shown in FIG. 4, a portion of the spacers 108 are disposed in the closed unit EU, and a second density is a ratio of a sum of areas of bottom surfaces of the spacers 108 in the closed unit EU to the unit area of the closed unit EU. For example, the second density may be greater than or equal to 0.2% and less than or equal to 0.56%, but not limited thereto. For example, the sum of the first density and the second density may be greater than or equal to 0.3% and less than or equal to 0.63%. In the present invention, the ratio of the first density to the second density may range from 1:2 to 1:8.

When all the spacers in the anti-peeping panel 12 are arranged periodically, the moire pattern will appear on the screen, deteriorating the display quality. In the present invention, the spacers 106 are regularly arranged and the spacers 108 are randomly distributed, and the moire phenomenon can be reduced and the display quality can be improved by such design. In addition, the light leakage will occur at the location of the spacers since no liquid crystal exists at such location in the anti-peeping panel 12. When the density of the spacer is low, the light leakage occurred at the location of the spacers can be reduced, thereby improving the anti-peeping effect.

When the spacers 108 are not randomly and uniformly distributed between the substrate 100 and the substrate 102, the surface pressure resistance and/or anti-peeping effect in different regions of the anti-peeping panel 12 will be different. In the present invention, the ratio of the first density of the spacers 106 to the second density of the spacers 108 in different regions of the anti-peeping panel 12 all conforms to the above range, which can ensure that the spacers 108 can be randomly and uniformly distributed between the substrates 100 and 102, and the surface pressure resistance and/or anti-peeping effect in different regions of the anti-peeping panel 12 can be uniform.

When the anti-peeping panel 12 is disposed on the display panel 10, the issue of surface pressure should be considered. For example, in some embodiments where the height difference between the height H1 of the spacer 106 and the height H2 of the spacer 108 is about 0.6 micrometers, the anti-peeping panel 12 can bear a surface pressure of less than 5 kilogram-force (kgf) when the ratio of the first density of the spacers 106 to the second density of the spacers 108 is 1:3.25 and the sum of the first density and the second density is 0.27%. The anti-peeping panel 12 can bear a surface pressure of less than 10 kgf when the ratio of the first density of the spacers 106 to the second density of the spacers 108 is 1:6.5 and the sum of the first density and the second density is 0.43%. Therefore, under the same conditions, the higher the second density of the spacers 108, the greater the surface pressure resistance that the anti-peeping panel 12 will have. In addition, when the sum of the first density and the second density is constant, the surface pressure resistance of the anti-peeping panel 12 can be increased by about 1.2 times when the height difference between the height H1 of the spacer 106 and the height H2 of the spacer 108 is reduced by 0.2 micrometers.

The display device of the present invention is not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 5:
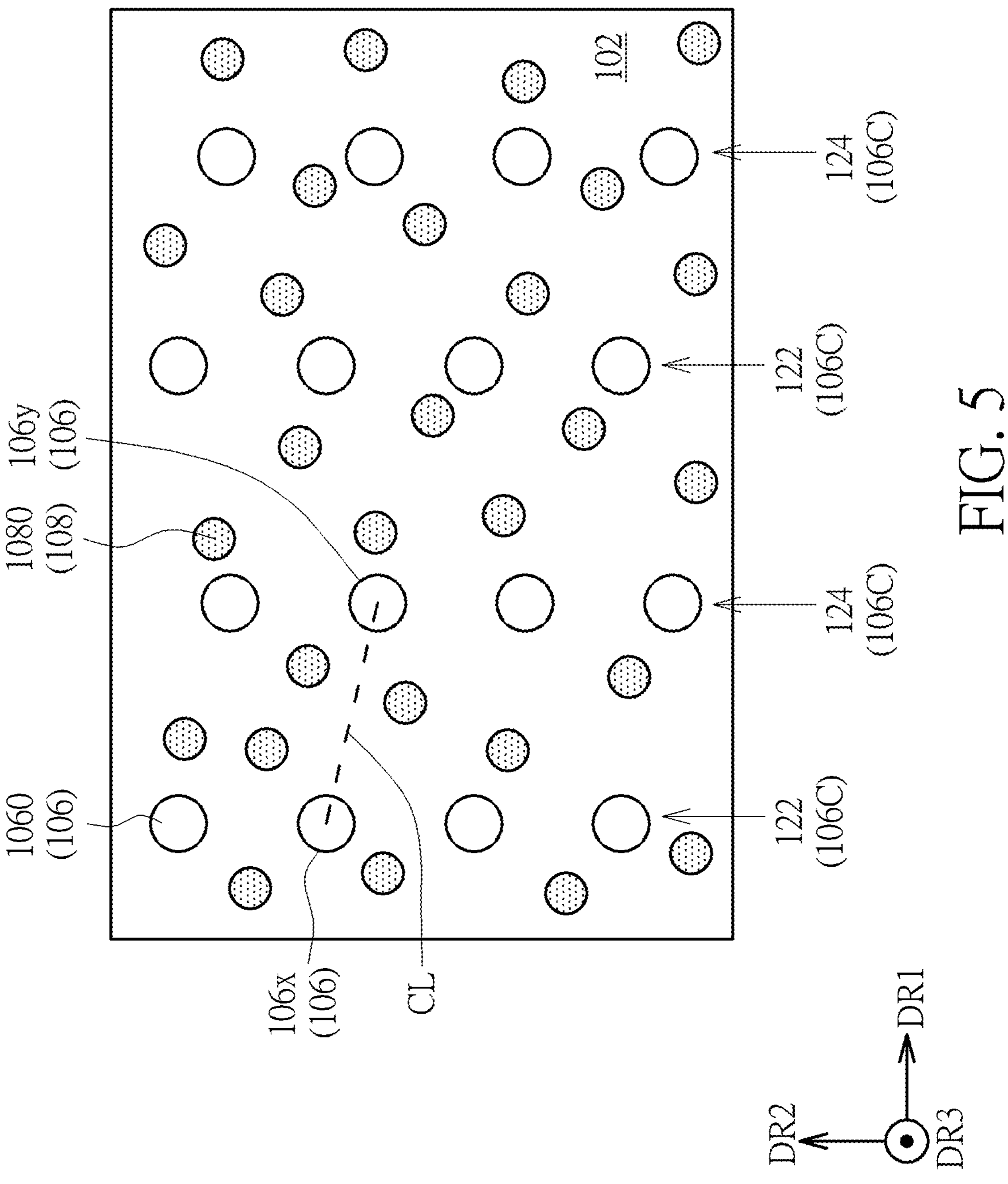
FIG. 5 is a schematic diagram illustrating the distribution of spacers in the anti-peeping panel according to a second embodiment of the present invention.
Figure 6:
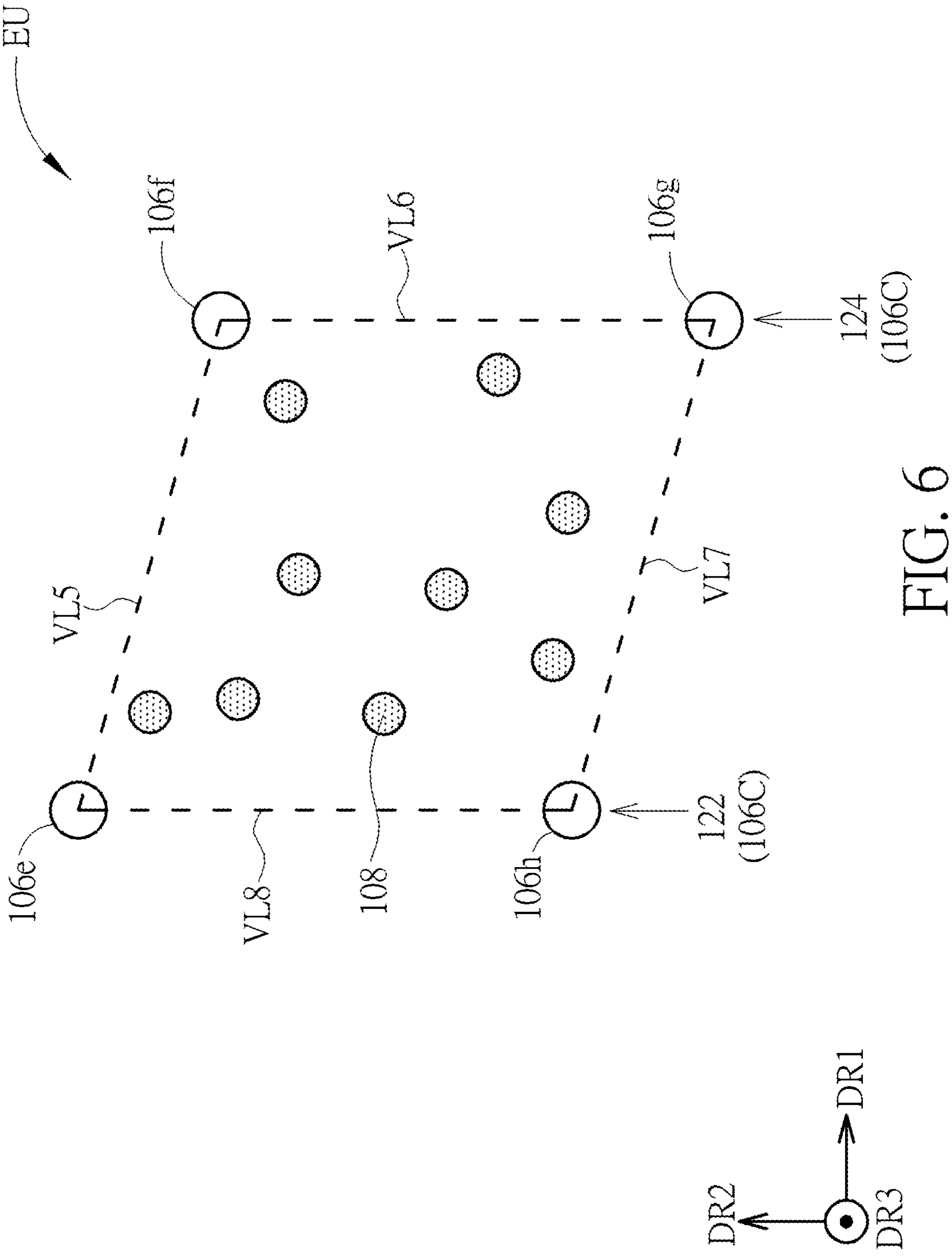
FIG. 6 is a schematic diagram illustrating a closed unit and the spacers according to the second embodiment of the present invention.

Referring to FIG. 5 and FIG. 6, FIG. 5 is a schematic diagram illustrating the distribution of spacers in the anti-peeping panel according to a second embodiment of the present invention, and FIG. 6 is a schematic diagram illustrating a closed unit and the spacers according to the second embodiment of the present invention. The arrangement of the spacers 106 in this embodiment is different from that of the spacers 106 in the first embodiment. In this embodiment, the columns 106C include a plurality of odd columns 122 and a plurality of even columns 124. As shown in FIG. 5, the odd columns 122 and the even columns 124 are alternately arranged, and the spacers 106 in the odd columns 122 and the spacers 106 in the even columns 124 are staggered. For example, in adjacent odd column 122 and even column 124, a spacer 106*x* in the odd column 122 and a spacer 106*y* in the even column 124 can be the closest spacers, and the extension direction of a connecting line CL (such as a straight line) connecting the center of the spacer 106*x* and the center of the spacer 106*y* and having the shortest distance is not parallel to the direction DR1 and the direction DR2.

As shown in FIG. 6, in the adjacent odd column 122 and even column 124, a spacer 106*e* and a spacer 106*h* may be two adjacent spacers in the odd column 122, and a spacer 106*f* and a spacer 106*g* may be two adjacent spacers in the even column 124. Two ends of a virtual line VL5 are connected with the spacers 106*e* and 106*f*, two ends of a virtual line VL6 are connected with the spacers 106*f* and 106*g*, two ends of a virtual line VL7 are connected with the spacers 106*g* and 106*h*, and two ends of a virtual line VL8 are connected with the spacers 106*h* and 106*e*. The virtual lines VL5, VL6, VL7, and VL8 are connected to each other to form the closed unit EU. In this embodiment, the closed unit EU may be a parallelogram or a rhombus, but not limited thereto. The calculation methods of the first density and the second density can refer to the first embodiment, and will not be redundantly described here.

Figure 7:
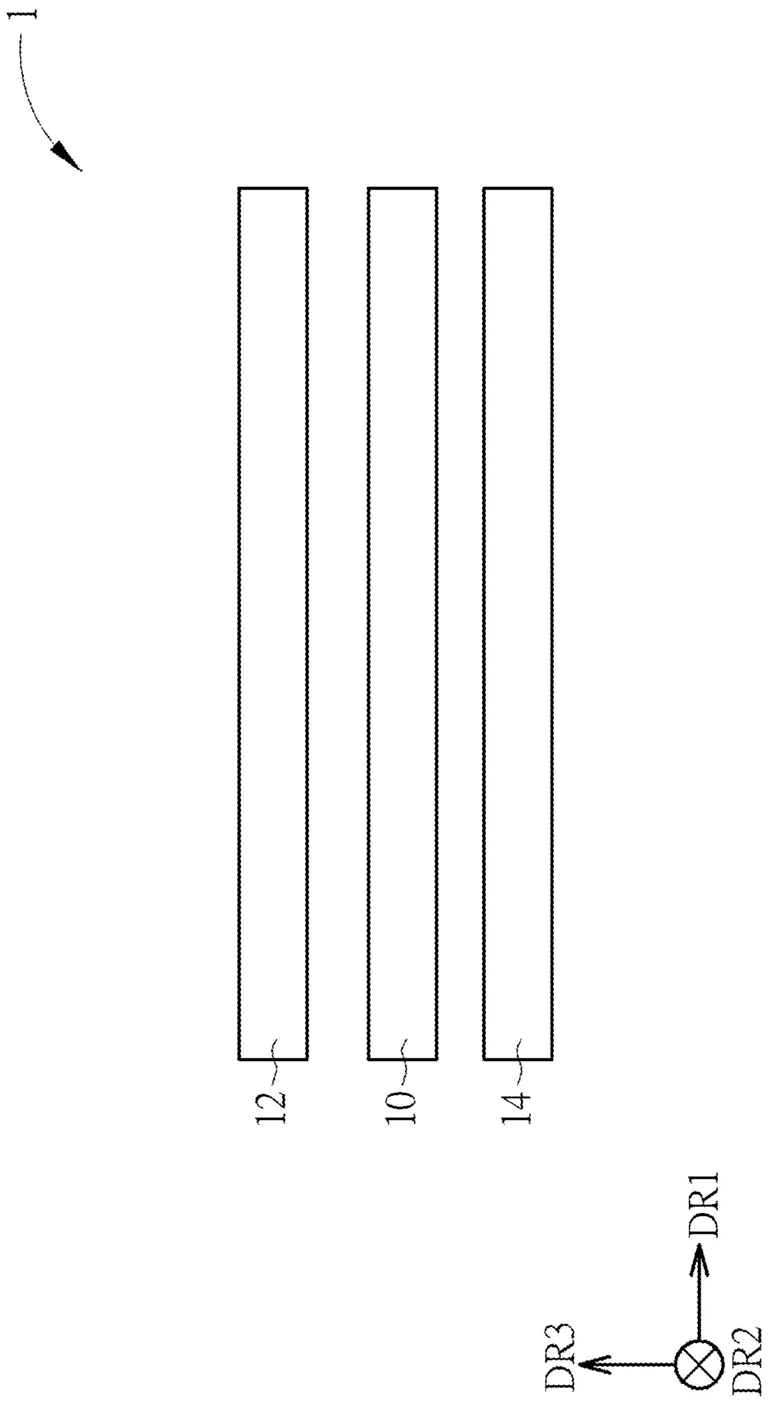
FIG. 7 is a schematic diagram illustrating a cross-sectional view of a display device according to a third embodiment of the present invention.
Figure 8:
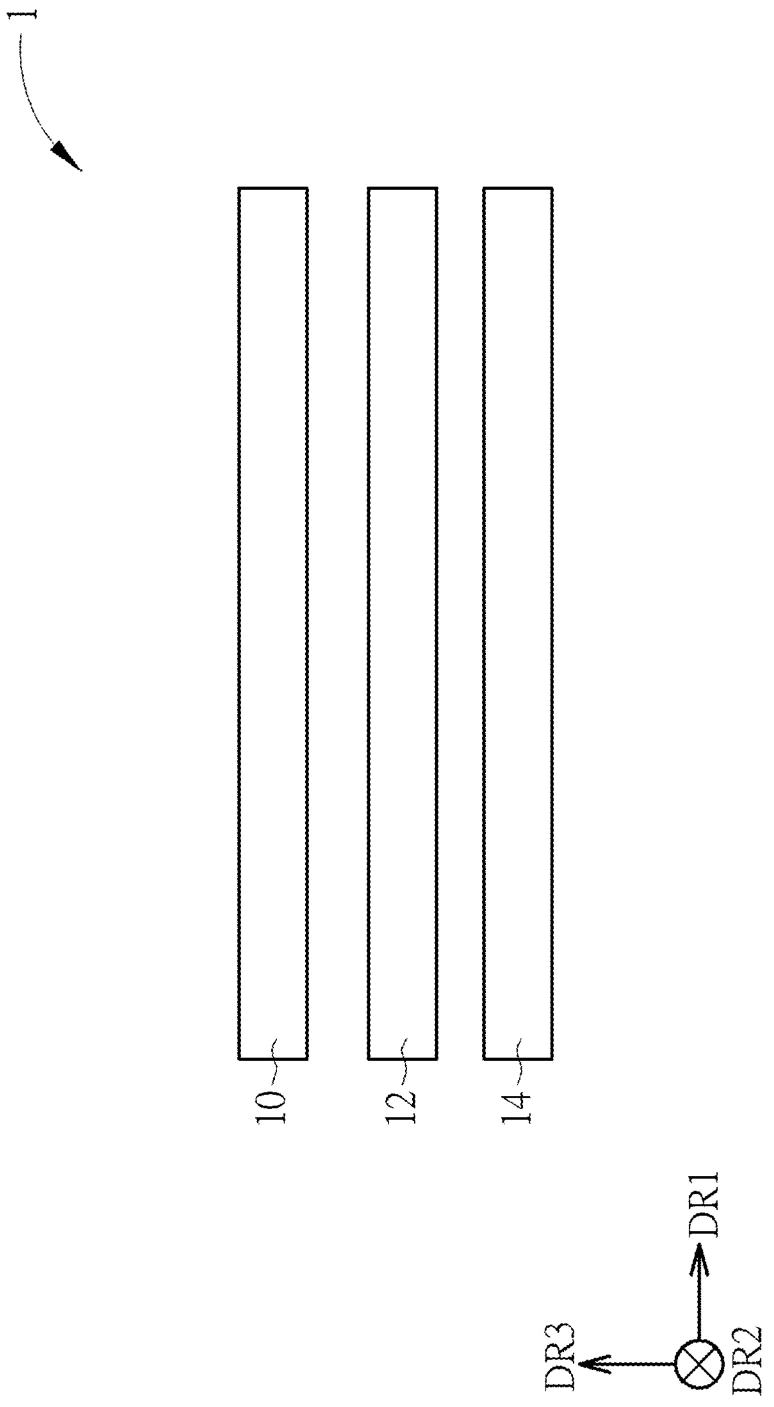
FIG. 8 is a schematic diagram illustrating a cross-sectional view of a display device according to a fourth embodiment of the present invention.
Figure 9:
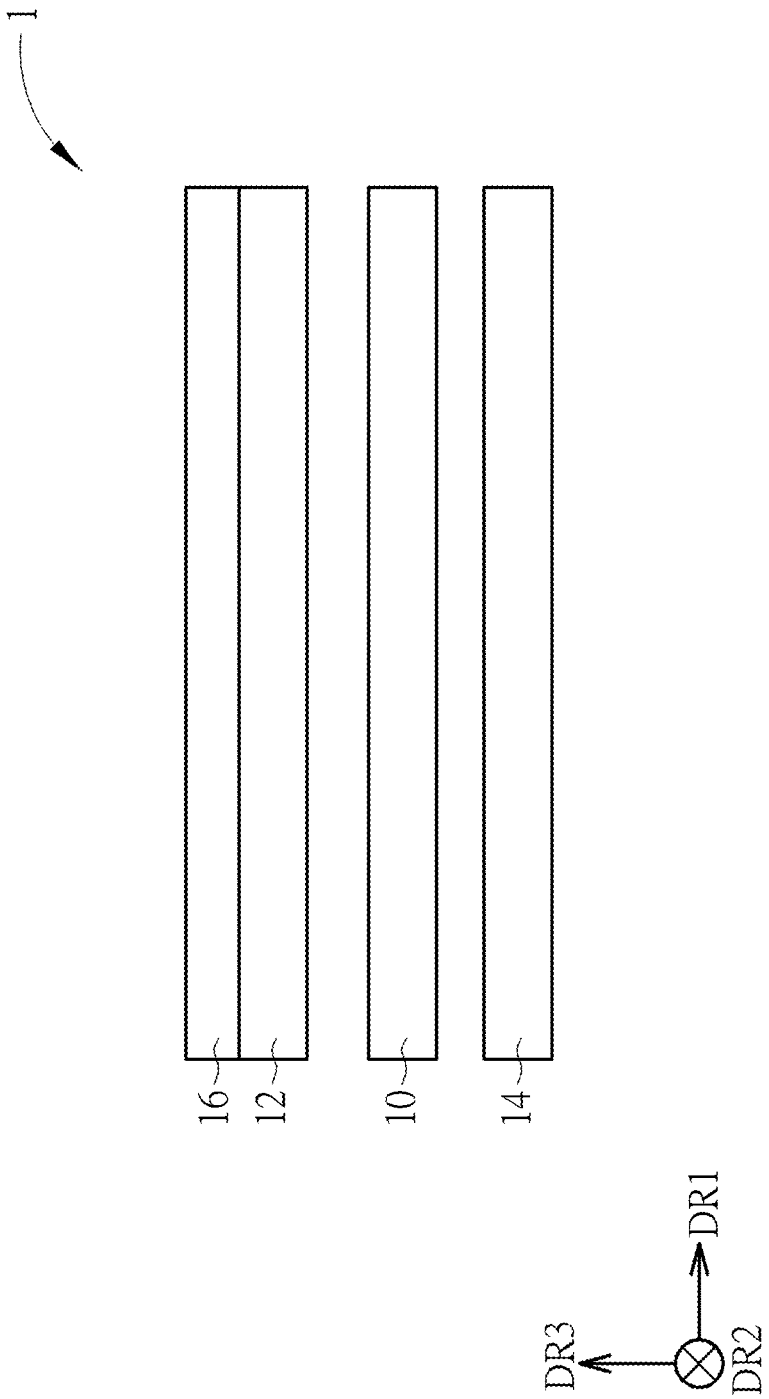
FIG. 9 is a schematic diagram illustrating a cross-sectional view of a display device according to a fifth embodiment of the present invention.

Referring to FIG. 7, it is a schematic diagram illustrating a cross-sectional view of a display device according to a third embodiment of the present invention. In this embodiment, the display panel 10 may be a non-self-luminous display panel such as a liquid crystal display panel. The display device 1 of this embodiment further includes a backlight module 14, and the display panel 10 is disposed between the backlight module 14 and the anti-peeping panel 12. Referring to FIG. 8, it is a schematic diagram illustrating a cross-sectional view of a display device according to a fourth embodiment of the present invention. Different from the third embodiment, the anti-peeping panel 12 of this embodiment is disposed between the backlight module 14 and the display panel 10. Since the anti-peeping panel 12 is disposed under the display panel 10, the anti-peeping panel 12 will not be directly pressed by the user, thus the issue of surface pressure is minor, and the sum of the first density and the second density or the ratio of the first density to the second density can be lower (e.g., less than 1:8), mainly improving the anti-peeping effect. Referring to FIG. 9, it is a schematic diagram illustrating a cross-sectional view of a display device according to a fifth embodiment of the present invention. Different from the third embodiment, the display device 1 of this embodiment further includes a touch component 16. The touch component 16 can be disposed on the anti-peeping panel 12, and the anti-peeping panel 12 can be disposed between the touch component 16 and the display panel 10. The touch component 16 may be, for example, an on-cell touch component with touch electrodes directly formed on the anti-peeping panel 12, but not limited thereto.

In summary, in the anti-peeping panel of the display device in the present invention, the first spacers are periodically arranged, the second spacers are randomly and uniformly distributed, and the ratio of the first density of the first spacers to the second density of the second spacers ranges from 1:2 to 1:8. The sum of the first density and the second density is greater than or equal to 0.3% and less than or equal to 0.63%. The light leakage occurred at the location of the spacers can be reduced when the density of the spacers is low, improving the anti-peeping effect. The second density is greater than or equal to 0.2% and less than or equal to 0.56%. The density of the second spacers can be appropriately increased when the issue of surface pressure is considered. In addition, the ratio of the first density to the second density in different regions of the anti-peeping panel conforms to the above-mentioned range, which can ensure that the second spacers can be randomly and uniformly distributed between the substrates, and the surface pressure resistance and/or anti-peeping effect in different regions of the anti-peeping panel can be uniform.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:

a display panel; and an anti-peeping panel disposed at one side of the display panel, the anti-peeping panel comprising:

a first substrate;

a second substrate disposed on the first substrate;

a liquid crystal layer disposed between the first substrate and the second substrate;

a plurality of first spacers disposed between the first substrate and the second substrate, wherein the plurality of first spacers are arranged in a plurality of columns, and four adjacent first spacers in the plurality of first spacers and four virtual lines define a closed unit, wherein two ends of each of the virtual lines are connected with two adjacent first spacers of the four adjacent first spacers, and the closed unit has a unit area, wherein a first density is a ratio of a sum of areas of bottom surfaces of the four adjacent first spacers in the closed unit to the unit area of the closed unit;

a plurality of second spacers disposed between the first substrate and the second substrate, wherein the plurality of second spacers are randomly distributed between the first substrate and the second substrate, wherein a second density is a ratio of a sum of areas of bottom surfaces of the second spacers in the closed unit to the unit area of the closed unit, the second density is greater than or equal to 0.2% and less than or equal to 0.56%, and a ratio of the first density to the second density ranges from 1:2 to 1:8;

a first transparent conductive layer disposed between the first substrate and the liquid crystal layer;

a first alignment film disposed between the first transparent conductive layer and the liquid crystal layer;

a second transparent conductive layer disposed between the plurality of first spacers and the second substrate and between the plurality of second spacers and the second substrate;

a second alignment film covering the plurality of first spacers and the plurality of second spacers; and a third transparent conductive layer disposed on an upper surface of the first substrate, wherein the third transparent conductive layer is separated from the first transparent conductive layer, and the first alignment film covers a side edge of the first transparent conductive layer but not covers the third transparent conductive layer.

2. The display device of claim 1, wherein the plurality of first spacers are arranged in a plurality of rows, each of the columns extends along a first direction, each of the rows extends along a second direction, and the first direction is perpendicular to the second direction.

3. The display device of claim 1, wherein the plurality of columns comprise a plurality of odd columns and a plurality of even columns, and the first spacers in the odd columns and the first spacers in the even columns are staggered.

4. The display device of claim 1, wherein the first spacers have a first height, the second spacers have a second height, and the first height is greater than the second height.

5. The display device of claim 1, further comprising a backlight module, wherein the display panel is disposed between the backlight module and the anti-peeping panel.

6. The display device of claim 5, further comprising a touch component, wherein the anti-peeping panel is disposed between the touch component and the display panel.

7. The display device of claim 1, further comprising a backlight module, wherein the anti-peeping panel is disposed between the backlight module and the display panel.

8. The display device of claim 1, wherein a sum of the first density and the second density is greater than or equal to 0.3% and less than or equal to 0.63%.

* * * * *